Sept. 3, 1940.         R. G. DREW                2,213,242
                  ADHESIVE TAPE DISPENSER
             Filed Feb. 18, 1938        2 Sheets-Sheet 1

Inventor:
Richard Gurley Drew
By: Paul Carpenter
Atty.

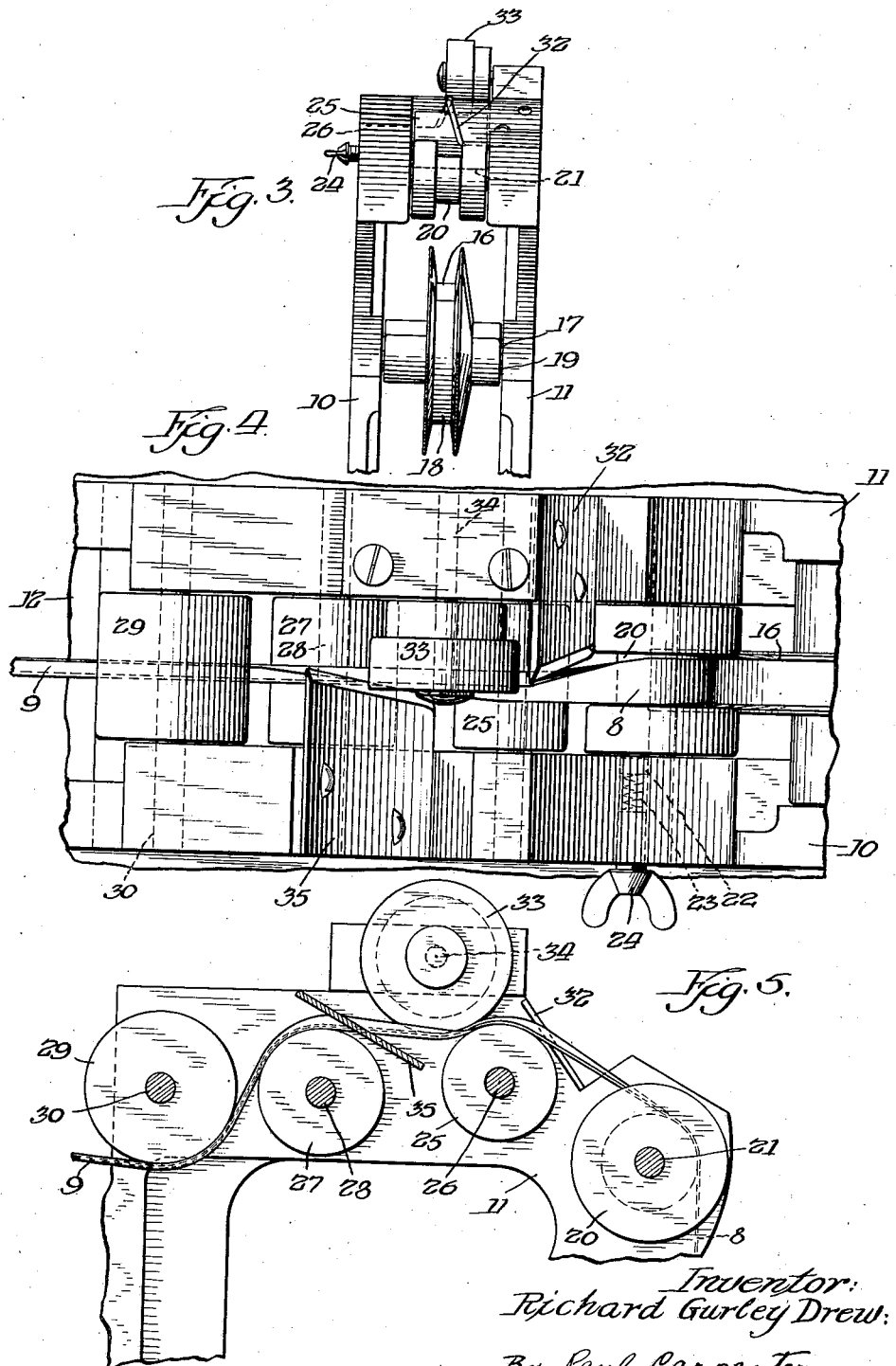

UNITED STATES PATENT OFFICE 2,213,242

ADHESIVE TAPE DISPENSER

Richard Gurley Drew, St. Paul, Minn., assignor to Minnesota Mining & Manufacturing Company, St. Paul, Minn., a corporation of Delaware Application February 18, 1938, Serial No. 191,263

5 Claims. (Cl. 93—84)

This invention relates to an adhesive tape dispenser provided with means for forming a flat pressure-sensitive adhesive tape into tubular form, self-sealed by the overlapping of edge portions, as the tape is drawn through the dispenser, and having the adhesive side exposed.

More particularly, the invention provides a simple, portable dispensing device adapted to receive a roll of pressure-sensitive adhesive tape, from which the operator may withdraw the tape in tubular form at such times and in such lengths as desired, merely by pulling out the desired length and tearing off, all of which may be accomplished with one hand.

As is well known in the adhesive tape art, a pressure-sensitive adhesive tape comprises a thin flexible backing having a normally tacky and pressure-sensitive adhesive coating. By "normally tacky and pressure-sensitive" it is meant that under ordinary atmospheric conditions the adhesive is stably in a condition such that it does not need to be activated by solvents or heat or otherwise prepared in order to secure good adherence to surfaces against which the adhesive coating (with its backing) may be pressed when used. Modern tapes of this type are available which are further characterized by having a unified adhesive coating possessed of such coherence in relation to adhesiveness and so firmly united to its backing that the adhesive tape may be stripped from smooth non-fibrous surfaces (not possessing special chemical affinity for the adhesive), to which it may have been temporarily applied, without offsetting of adhesive material. Hence such an adhesive coating may be termed "non-offsetting," and this expression designates an important physical or physico-chemical property or characteristic of the adhesive coating.

While the present invention relates broadly to the dispensing of adhesive tapes of this pressure-sensitive type, the dispenser and product herein specifically described have been developed with special reference to pressure-sensitive adhesive tapes of the non-offsetting type, and even more particularly, with special reference to tapes having a "unified" cellulosic backing such as a paper impregnated with a non-tacky rubber-resin mixture and having a back sizing coating of shellac, coated with a water-insoluble rubber-resin adhesive. Such pressure-sensitive adhesive tapes are well known and readily available on the market under the trade-mark "Scotch."

The dispenser and the article dispensed have been developed with particular reference to providing an "adhesive string." This is formed when a narrow tape is formed into a tubular product (which may be more or less flattened) of small diameter or width having the adhesive coating exposed so that the entire periphery is adhesive. Thus, for example, when a tape of ⅜ inch width is folded from both sides so as to provide a self-sealed lap of approximately one-third the original tape width, an adhesive string having a width of approximately ⅛ inch is provided. Being adhesive on its entire outer or exposed surface, such adhesive string is well adapted to the sealing or tying of irregular shaped packages.

As an example showing the use of such adhesive string, mention may be made of tying wrapped cabbages. Cabbages are often prepared for shipping in ice by being wrapped in parchmentized paper. The wrapper is gathered to form a neck which is tied. Tying may be accomplished by winding a length of the aforesaid adhesive string about the parchmentized paper neck so that the string is wound on itself. The adhesive surfaces stick aggressively to each other to form a bonding not loosened or destroyed by the presence of water. When the wrapped cabbage is shipped in shaved ice, the water will not loosen the tie. When it is desired to unwrap the cabbage, this may be readily accomplished by seizing the end of the adhesive string and unwinding.

The accompanying drawings show an illustrative embodiment of a tape dispenser adapted to dispense a pressure-sensitive adhesive tape in the form of the aforesaid adhesive string. In the drawings:

Fig. 3 is an end elevation of a portion of the machine, showing the stationary folding knives;

Fig. 4 is an enlarged plan view; and

Fig. 5 is a corresponding enlarged vertical section taken inside the side frame, showing the stationary folding knives and the associated rollers.

Figure 1:
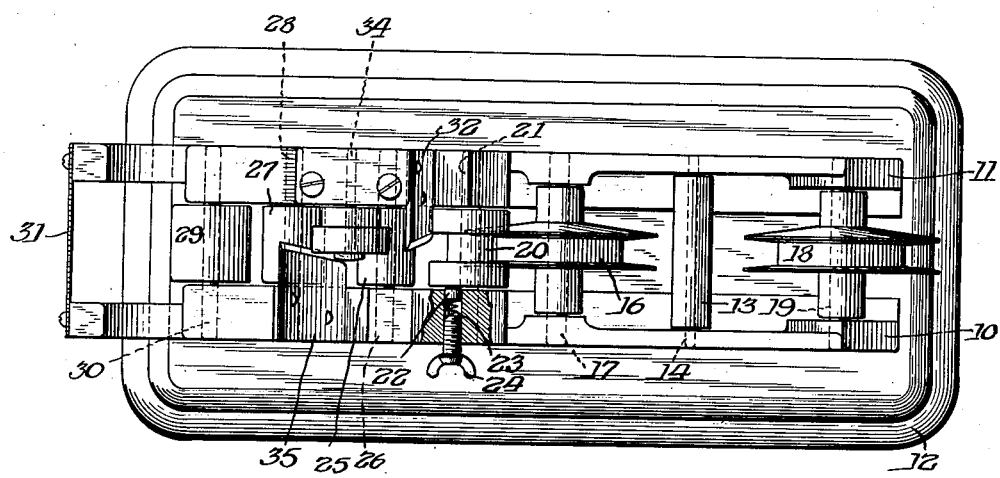
Fig. 1 is a plan view.
Figure 2:
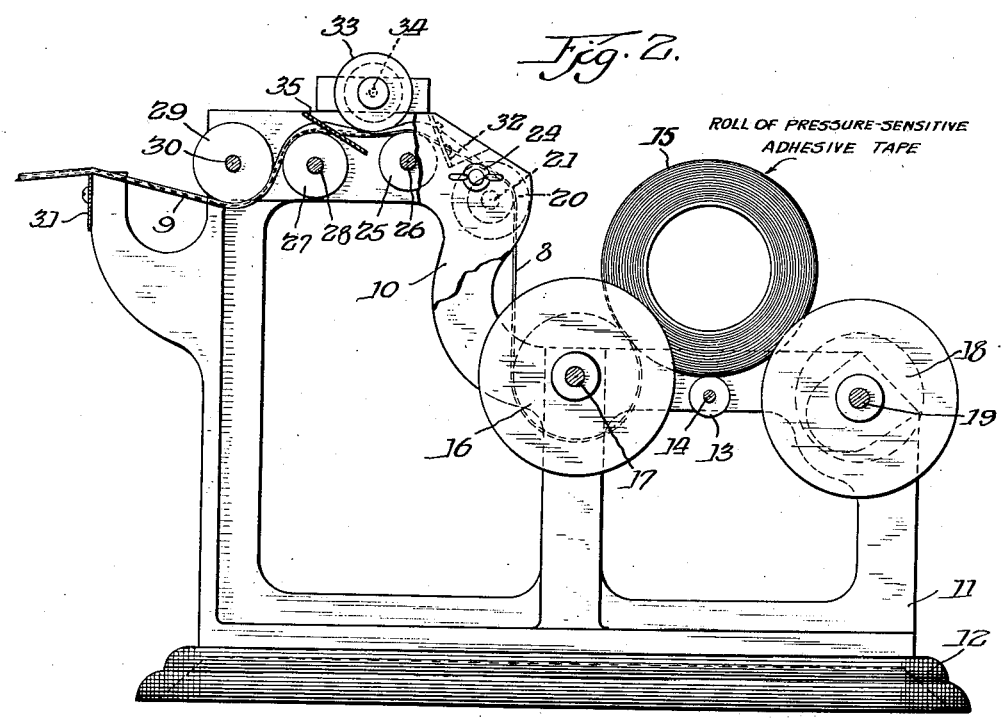
Fig. 2 is a side view partly in elevation but mostly comprising a vertical section taken inside the side frame.

The drawings illustrate a machine so constructed that a flat adhesive tape 8, after being pulled through the folding part of the machine, emerges in the form of an adhesive string 9, of the character previously described.

Two suitably spaced parallel side frames, 10 and 11, secured to base 12, serve as supports for the operating parts. At the rear, and below the folding mechanism, there is located a small roller 13 journaled on transverse pin 14, which extends between the frames and serves as a rotatable support for the roll of adhesive tape 15. In front of this roller is a flanged take-off guide roller 16 journaled on transverse pin 17. The width between flanges is slightly greater than the tape width. This roller is positioned so that the roll of tape normally rests against the roller as tape is withdrawn, and lies between the flanges thereof, the latter serving to maintain the roll of tape in an upright position. A similar flanged roller 18 journaled on transverse pin 19 lies to the rear of supporting roller 13, and in alignment with roller 16, and the rear part of the roll of tape lies between its flanges. Thus the flanges of rollers 16 and 18 cooperate to maintain the roll of tape in an upright position and in proper alignment. Roller 18 also serves to catch the roll of tape if it rolls rearwardly. The tape is withdrawn downwardly from the front of its roll and passes under roller 17 and thence forwardly up to the folding mechanism proper, the roller contacting the back (non-adhesive) side of the tape.

After leaving this roller, the tape passes upward to and forwardly over flanged roller 20 journaled on transverse pin 21. This roller serves as a tape tensioning and guiding device, and contacts the adhesive side of the tape. An adjustable braking device prevents the roller from freely rotating and thus insures tension in the tape as it leaves the roller and is pulled forward. Braking is accomplished by a movable friction button or stud 22, having a rounded end bearing against the end of the roller, seated in a hole passing through frame 10. The outer end of the hole is threaded and receives a wing-headed screw 24. A coil spring 23 lies between the tip of the screw and the friction button and presses the latter against the roller. The degree of loading of the spring, and hence the braking action, is adjusted by turning the screw.

After leaving roller 20, the tape moves forward at an upward angle and passes successively over roller 25 journaled on transverse pin 26, and roller 27, journaled on transverse pin 28. These rollers are not flanged, and are spaced apart a substantial distance. The tape then passes down and under unflanged roller 29, journaled on transverse pin 30, and thence upward at a slight angle to the upper serrated edge of blade 31, which extends transversely between frames 10 and 11 to which it is screwed.

As the tape approaches roller 25, one edge is bent up and over by the inner end of transverse stationary folding blade 32 which is secured to frame 11 and projects into the path of travel of the tape. The blade slants upwardly, at a steep angle, in the direction of tape movement. The inner projecting end is cut at an angle so that it slopes upwardly toward the opposite side frame, and is bevelled on the side approached by the tape, to form a straight turning edge disposed in a manner to turn over the near side of the approaching tape. When the tape then passes over roller 25, the bending of the tape causes the overturned tape to be drawn down more nearly flat, and it is then pressed and held down by roller 33, journaled on pin 34 which is fixed in frame 11. This roller is located above and to the front of roller 25, with its periphery close to that of the latter. The tape bearing surface of roller 25 is approximately the width of the tape, but is offset toward frame 11 so as not to interfere with the subsequent folding over of the opposite side of the tape.

Transverse stationary folding blade 35 is secured to frame 10 and projects into the path of travel of the tape as it approaches the top of roller 27. The blade slants upwardly in the direction of tape movement and is similar to folding blade 32. The inner projecting end is cut at an angle so that it slopes upwardly toward the opposite side frame, and is bevelled on the side approached by the tape, to form a straight turning edge disposed in a manner to turn over the side of the approaching tape. The edge commences to turn up prior to reaching the blade, but premature turning is prevented by roller 33.

The two folding blades, 32 and 35, are so positioned that each causes a folding over of slightly less than one-third the tape width, the side portion folded over by blade 35 thus substantially coextensively overlapping the opposite side portion folded over by blade 32 so as to produce an ultimate flattened tubular adhesive string having a width approximately one-third the width of the initial flat adhesive tape. The pressure-sensitive adhesive coating on the under fold adheres to the back of the upper fold when the latter is pressed down upon it, so as to form a seal without activation by heat or a solvent.

After passing folding blade 35, the folded tape bends down over roller 27, causing a flattening and bringing the upper fold or overlap down upon the lower one in sealing relation. The two are further pressed together in passing under roller 29, from which the fully formed adhesive string 9 passes.

In operation, a roll of pressure-sensitive adhesive tape having been placed in position and the tape threaded through the machine, the operator simply pulls out such length of adhesive string beyond serrated blade 31 as is desired, and then lowers his hand to bring the string in contact with the blade, and pulls down and to the side to tear off the desired length of adhesive string. This leaves the tip of the adhesive string, leading from the machine, stuck to blade 31. When the operator desires more adhesive string, he simply grabs the end of the adhesive string inside the blade, between thumb and forefinger, lifts up to free the tip from the blade, pulls out the desired length, and tears it off, as just described. Blade 31 thus serves both as a holder for the tip of the adhesive string projecting from the dispenser, and as a severing means.

What I claim is as follows:

1. An adhesive tape dispenser comprising a holder for a roll of pressure-sensitive adhesive tape, mechanical means for continuously turning tape over upon itself with the adhesive side exposed and bringing the edge portions in overlapping self-sealed relation forming a continuous tube, as the tape is drawn from the roll and through the dispenser.

2. An adhesive tape dispenser of the character described comprising a holder for a roll of pressure-sensitive adhesive tape, means for guiding tape from the roll through the dispenser, means for successively and continuously folding over the side portions of the tape in overlapping sealing relation with the adhesive coating exposed, as the tape is drawn through the dispenser, and means for pressing the resultant overlapping folds together to form a self-sealed flattened tube drawn from the dispenser.

3. A device for folding a flat pressure-sensitive adhesive tape, drawn therethrough, into a flattened tubular form with the adhesive exposed, comprising means for guiding the tape and maintaining it under tension, two fixed folding means projecting into the path of the tape so as to successively coact with the sides of the tape to continuously fold over the side portions in overlapping sealing relation with the adhesive coating exposed, and means for pressing the resultant overlapping folds together to form a self-sealed flattened tube.

4. A portable manually operated dispenser adapted to receive a flat pressure-sensitive adhesive tape and automatically fold it into a flattened tube form with the adhesive exposed, as the tube is manually pulled from the dispenser, having a pair of fixed folding blades shaped and positioned to coact with the sides of the tape as it is drawn past to successively and continuously fold over the side portions of the tape in overlapping folds with the adhesive coating on the outside, one fold lying below the other in sealing relation, guide means for positioning the tape as it moves to and past the blades and means for maintaining it under tension, roller means for pressing down and holding the first-formed fold while the other is folded over it, and roller means for pressing the resultant folds together to form a self-sealed flattened tube.

5. A portable manually operated dispenser adapted to receive a flat narrow pressure-sensitive adhesive tape and automatically fold it into a tubular "adhesive string" as the end of the latter is manually pulled from the dispenser, and comprising a holder for a roll of said adhesive tape, a flanged guide roller and friction means for restraining rotation of the roller for tape tensioning, a pair of fixed folding blades shaped and positioned to bear against the sides of the tape to successively and continuously fold over the side portions of the tape in overlapping folds with the adhesive coating on the outside, one fold lying below the other in sealing relation, a roller between said blades adapted to press down and hold the first fold, a pair of rollers beyond said blades adapted to coact with the folded tape to press together the folds to form a self-sealed flattened tube constituting the "adhesive string," and a transverse element adapted to sever the formed "adhesive string," when a desired length has been pulled from the dispenser, and to hold the remaining end, in position to be grasped for pulling a further length from the dispenser.

RICHARD GURLEY DREW.